(12) United States Patent
Okamoto

(10) Patent No.: US 7,379,425 B2
(45) Date of Patent: *May 27, 2008

(54) ADDRESS CONVERTER FOR GATEWAYS INTERCONNECTING NETWORKS OF DIFFERENT ADDRESS FORMATS

(75) Inventor: Tsugio Okamoto, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 11/202,365

(22) Filed: Aug. 12, 2005

(65) Prior Publication Data

US 2006/0039377 A1 Feb. 23, 2006

Related U.S. Application Data

(63) Continuation of application No. 09/406,803, filed on Sep. 28, 1999, now Pat. No. 6,950,433.

(30) Foreign Application Priority Data

Sep. 28, 1998 (JP) .................. 10-274034

(51) Int. Cl.
*H04J 1/16* (2006.01)
*H04J 3/14* (2006.01)

(52) U.S. Cl. .............. 370/237; 370/238; 370/466; 709/239; 709/240; 709/241; 709/242

(58) Field of Classification Search ............... 370/392, 370/393, 401, 466, 467, 475, 237, 238; 709/238, 709/239, 240, 241, 242
See application file for complete search history.

(56) References Cited

U.S. PATENT DOCUMENTS

| | | | |
|---|---|---|---|
| 4,897,841 A | 1/1990 | Gang, Jr. ..................... | 370/401 |
| 5,852,660 A | 12/1998 | Lindquist et al. ........... | 379/230 |
| 5,940,394 A | 8/1999 | Killian ........................ | 370/393 |
| 5,956,335 A * | 9/1999 | Backes et al. .............. | 370/392 |
| 6,038,233 A | 3/2000 | Hamamoto et al. ......... | 370/401 |
| 6,061,356 A * | 5/2000 | Terry ........................... | 370/401 |
| 6,118,784 A | 9/2000 | Tsuchiya et al. ............ | 370/401 |
| 6,249,523 B1 | 6/2001 | Hrastar et al. .............. | 370/401 |
| 6,373,847 B1 | 4/2002 | Scoggins et al. ........... | 370/401 |
| 6,377,990 B1 * | 4/2002 | Slemmer et al. ............ | 709/225 |
| 6,721,306 B1 * | 4/2004 | Farris et al. ................ | 370/352 |
| 6,950,433 B1 * | 9/2005 | Okamoto ..................... | 370/392 |
| 2001/0043604 A1 * | 11/2001 | Li et al. ...................... | 370/395 |
| 2005/0053082 A1 * | 3/2005 | Dillon ......................... | 370/401 |
| 2005/0278459 A1 * | 12/2005 | Boucher et al. ............ | 709/250 |

FOREIGN PATENT DOCUMENTS

JP 9-233112 9/1997

* cited by examiner

*Primary Examiner*—Jean Gelin
*Assistant Examiner*—Inder Pal Mehra
(74) *Attorney, Agent, or Firm*—Harrity Snyder, LLP

(57) ABSTRACT

In a gateway, a packet received from a first network contains first address data conforming to the first network in the packet header and second address data conforming to a second network in an auxiliary header. The first address data of the packet is then rewritten with the second address data of the packet and transmitted from the gateway to the second network.

12 Claims, 5 Drawing Sheets

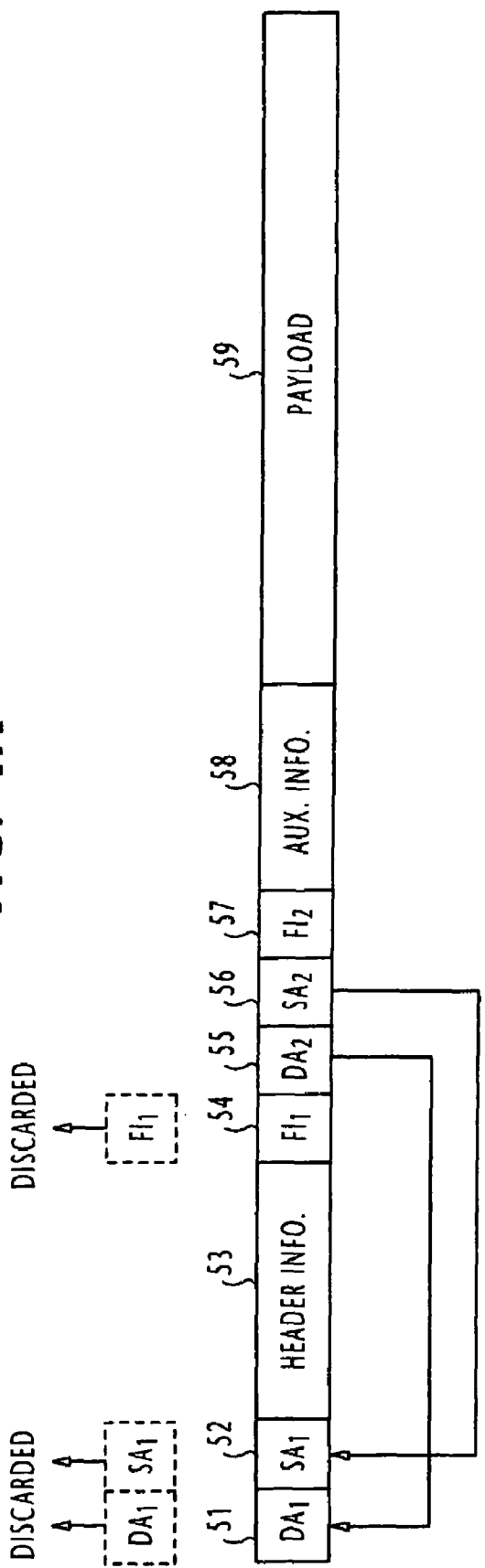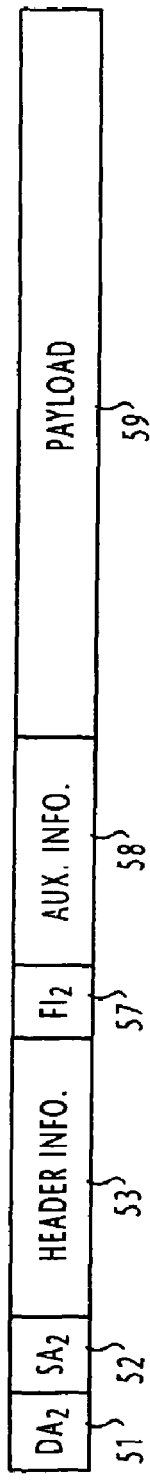

ADDRESS CONVERTER FOR GATEWAYS INTERCONNECTING NETWORKS OF DIFFERENT ADDRESS FORMATS

RELATED APPLICATION

This application is a continuation of U.S. patent application Ser. No. 09/406,803 filed Sep. 28, 1999 now U.S. Pat. No. 6,950,433, the disclosure of which is incorporated herein by reference.

BACKGROUND OF THE INVENTION

1. Field of the Invention

The present invention relates generally to address conversion and more specifically to conversion of address data contained in a packet when the packet travels between networks of different address formats.

2. Description of the Related Art

Address conversion is necessary for a gateway when routing a packet from a first network to a second network if the address formats of the networks are different from each other. For example, in an internetwork environment, local private networks are connected to remote private networks via a global network. In such configurations, addresses of the private networks are organized independently of those assigned by the global network in order to facilitate address management of the private networks.

An address converter disclosed in Japanese Laid-Open Patent Specification 09-233112 uses a database that maps addresses of a first network to corresponding addresses of a second network. When the address converter receives a packet from the first network, it makes a search through the database for the corresponding address data of the second network that is mapped to the address data contained in the packet. However, if the amount of data contained in the database increases with an increasing number of users, the time taken to search through the database becomes substantial. Hence, there is a significant amount of latency in the transmission of packets across different networks.

SUMMARY OF THE INVENTION

It is therefore an object of the present invention to provide a method of packet transmission and an address converter for reducing the latency of packets travelling across first and second networks of different address formats.

The stated object is achieved by transmitting second address data conforming to the second network with first address data that conforms to the first network.

According to a first aspect of the present invention, there is provided a method of transmitting packets between first and second networks of different address formats, comprising the steps of (a) receiving, from a first network, a packet containing first address data conforming to the first network and second address data conforming to a second network, the first address data being contained in a packet header of the packet and the second address data being contained in an auxiliary header of the packet, (b) rewriting the first address data with the second address data, and (c) transmitting the packet to the second network.

According to a second aspect of the present invention, there is provided an address converter for use in a gateway connected between first and second networks of different address formats, comprising receive means for receiving, from the first network, a packet containing first address data formulated according to the first network and second address data formulated according to the second network, the first address data being contained in a packet header of the packet and the second address data being contained in an auxiliary header of the packet. Control means is provided for rewriting the first address data of the packet with the second address data of the packet. Transmit means transmits the packet to the second network.

BRIEF DESCRIPTION OF THE DRAWINGS

The present invention will be described in further detail with reference to the accompanying drawings, in which:

FIGS. 4A and 4B are illustrations of the register during address conversion according to the first embodiment;

DETAILED DESCRIPTION

Figure 1:
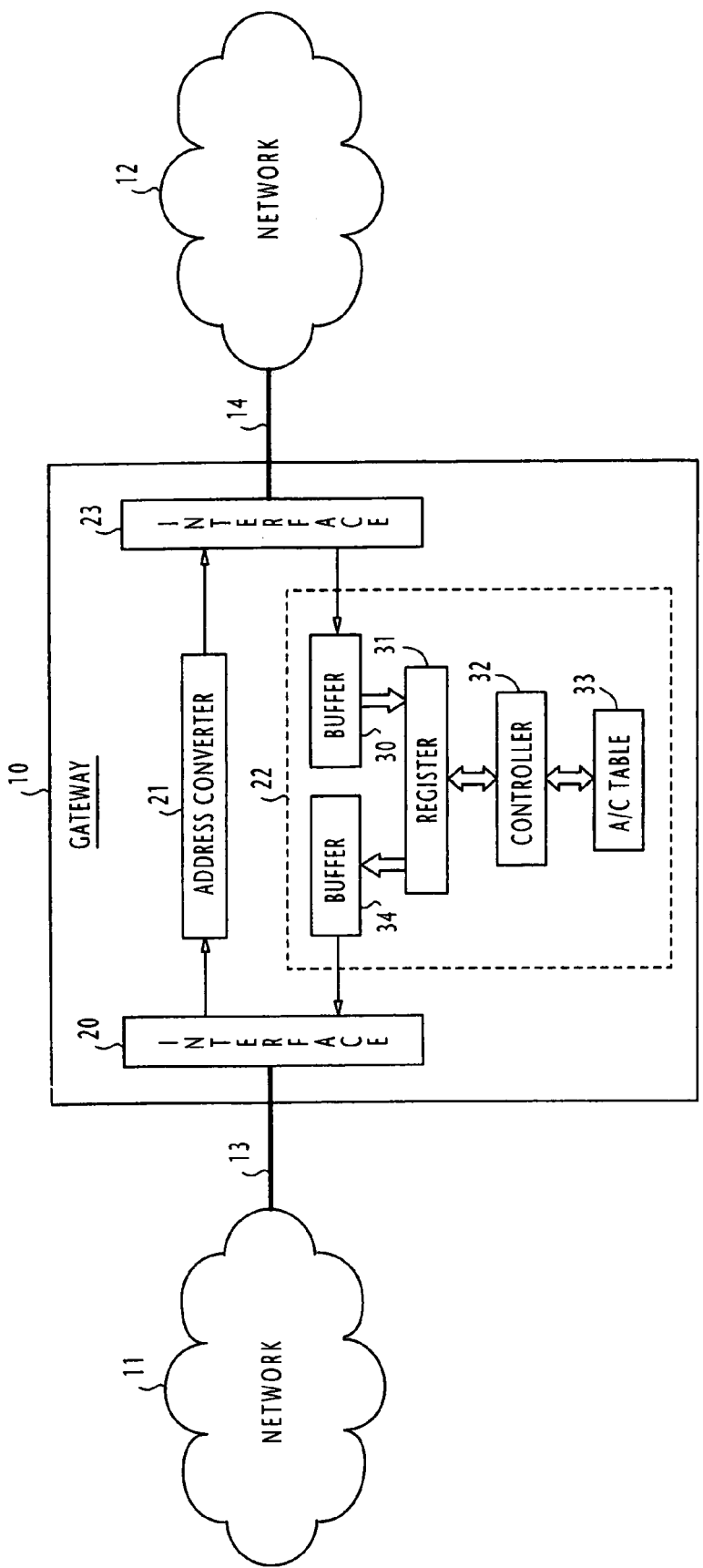
FIG. 1 is a block diagram of a communication system in which the gateway of the present invention is shown interconnecting networks of different address formats.

FIG. 1 illustrates a gateway 10 of the present invention for interconnecting networks 11 and 12 via communication links 13 and 14. The address format of each network is different from the address format of the other, and for this reason, the gateway 10 includes a pair of address converters 21 and 22 of identical construction, each for a particular direction of transmission. Specifically, the address converter 21 provides address conversion on signals received from the network 11 via an interface unit 20 to the network 12 via an interface unit 23, the address converter 22 providing address conversion on signals received from the network 12 via interface unit 23 to the network 11 via interface unit 20.

As shown in detail, the address converter 22 includes an input buffer 30 for buffering incoming packets from the link 14, and a register 31 for storing a packet from the input buffer 30 on a one-at-a-time basis. A controller 32 is provided for making a search through the register 30 for target address data when a packet is stored. Controller 32 performs conversion of the packet's address data using the target address data and formulates an outgoing packet in a manner as will be described in detail later, and forwards the outgoing packet to an output buffer 34 where the packet is buffered and transmitted to the link 13.

An address conversion table 33 is also connected to the controller 32 to be used when the target address data is not found in the received packet. Address conversion table 33 maps the address data of a network to corresponding address data of another network.

Figure 2:
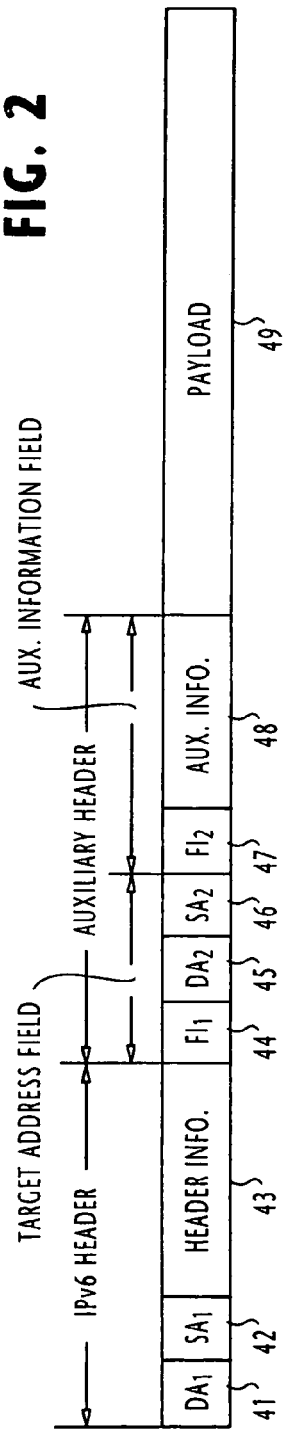
FIG. 2 shows the data format of a packet used in the present invention.

As shown in FIG. 2, the packet of the present invention is divided into a packet header (such as Ipv6 header), an auxiliary header following the packet header and a payload field. The packet header consists of a destination address ($DA_1$) field 41, a source address ($SA_1$) 42 and a remainder field 43 for mapping other header information. The original destination and source addresses $DA_1$ and $SA_1$ are conforming to the format of the source network.

According to the present invention, the auxiliary header includes a target address field and an auxiliary information field. The target address field is divided into subfields 44, 45 and 46 for respectively mapping a field indicator $FI_1$ for specifying the auxiliary header, a target destination address ($DA_2$) and a target source address ($SA_2$). The target destination and source addresses $DA_2$ and $SA_2$ are conforming to the format of the destination network. The auxiliary information field is divided into subfields 47 and 48 for respectively mapping a field indicator $FI_2$, which specifies the auxiliary information field 48, and auxiliary information. The auxiliary information field 48 is followed by a payload field 49 in which payload bits are placed.

Figure 3:
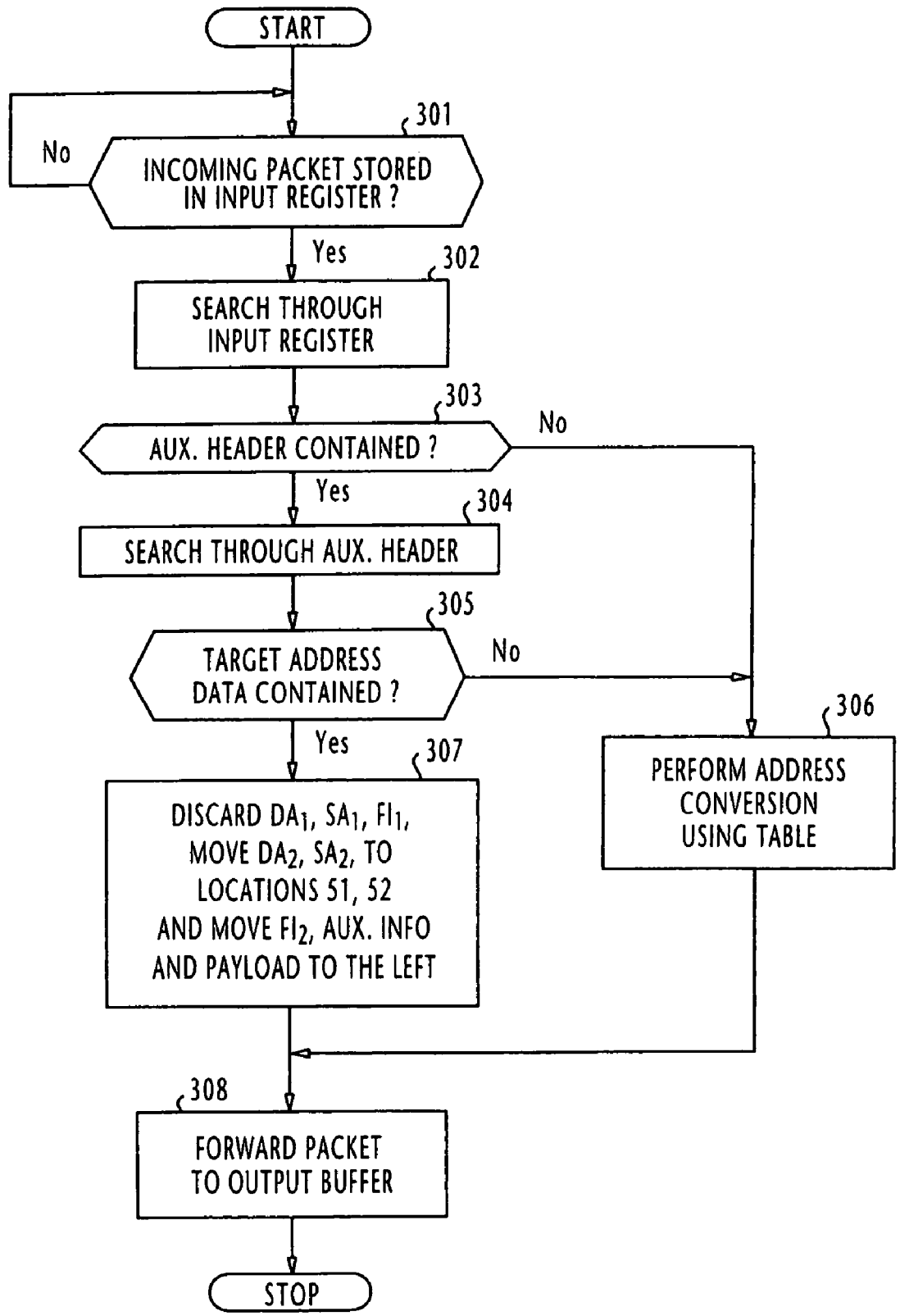
FIG. 3 is a flowchart of the operation of the controller of FIG. 1 when performing an address conversion on an incoming packet according to a first embodiment of the present invention.

According to a first embodiment of the present invention, the operation of the controller 32 of each address converter proceeds according to the flowchart of FIG. 3.

When an incoming packet is received in the input buffer 30 and then transferred to the register 31 (step 301), the contents of the packet are stored in storage locations 51 to 59 of the register as shown in FIG. 4A corresponding to fields 41 to 49 of the packet.

The controller 32 proceeds to step 302 to make a search through the register 31 to determine if there is an auxiliary header to determine (step 303). If there is none, the decision at step 303 is negative and the controller proceeds to step 306 to perform an address conversion on the incoming packet using the conversion table 33 and forwards the address-converted packet to the output buffer 34 (step 308) and proceeds to the end of the routine.

If the decision at step 303 is affirmative, the controller proceeds to step 304 to make a search through the auxiliary header to determine if it contains a target address field (step 305). If there is none, the controller proceeds to step 306.

If target address data is contained in the auxiliary header, the decision at step 305 is affirmative and the controller proceeds to step 307 to discard $DA_1$, $SA_1$, $FI_1$ and move $DA_2$, $SA_2$ to storage locations 51, 52 of the register 30, and move $FI_2$, auxiliary information and payload data from locations 57 to 59 to the left so that $FI_2$ immediately follows the header information stored in location 53. In this way, an outgoing packet is formulated in the register 31 as shown in FIG. 4B.

The controller then forwards the outgoing packet to the output buffer 34 for transmission. Because the storage locations 55, 56 and 57 are eliminated, the whole length of the outgoing packet is advantageously shorter than the incoming packet in terms of bandwidth occupied during transmission.

Therefore, the destination and source addresses of the source network contained in the incoming packet are converted to the addresses of the destination network.

Since time-consuming table search is not required for packets if they contain the address data of their destination network, they experience a minimum latency when they travel from one network to another. Further, the cost of the gateway is reduced due to the elimination of the need to provide costly high speed address conversion.

In the previous embodiment, the target addresses cannot be reconverted to the original addresses, and hence the original addresses can no longer be used. However, there may be instances where an intermediate network is interposed between the source and destination networks, and the source and destination networks use the same address format while the intermediate network uses a different address format. In such applications, the original addresses are converted to the target addresses in a first gateway at the boundary between the source and intermediate networks and the target addresses are reconverted to the original addresses in a second gateway at the boundary between the intermediate and destination networks.

Figure 5:
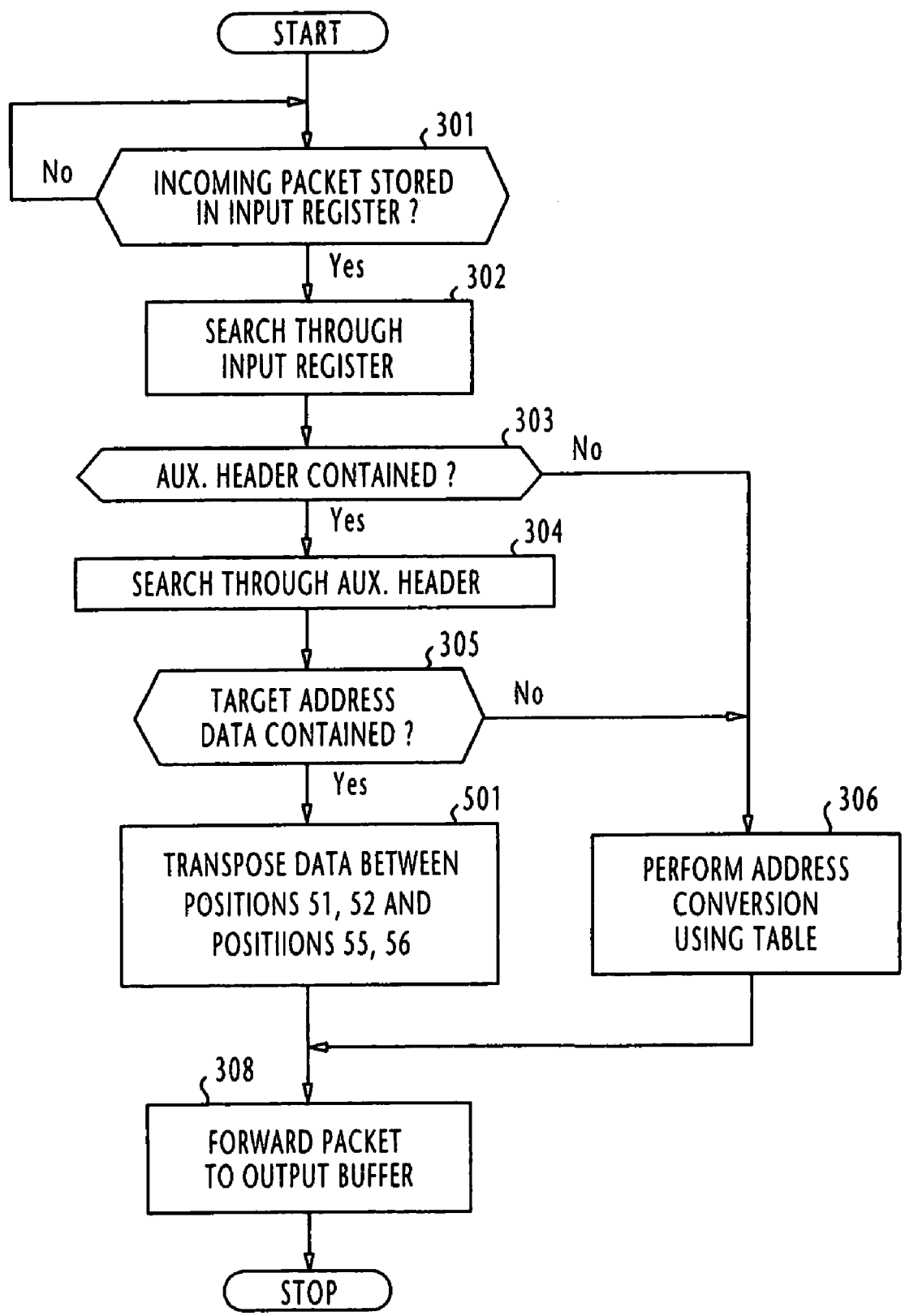
FIG. 5 is a flowchart of the operation of the controller when performing an address conversion on an incoming packet according to a second embodiment of the present invention.

This is implemented by transposing the original address data and the target address data between different storage location of the register 31 according to a flowchart shown in FIG. 5, in which steps corresponding to those in FIG. 3 are marked with the same numerals as those in FIG. 3 and the description thereof is omitted for simplicity.

Figure 6A:
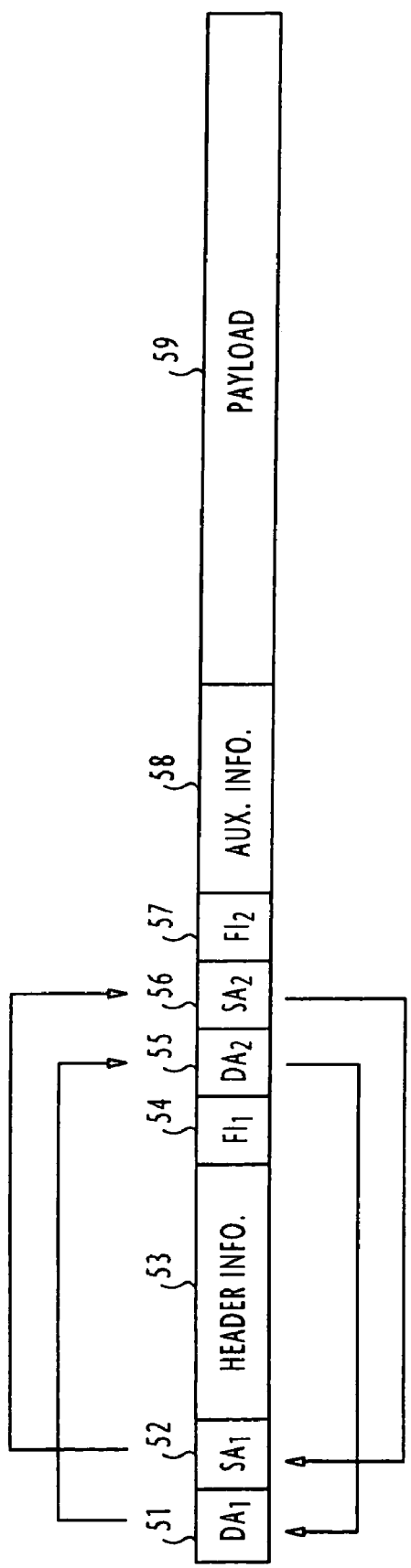
FIGS. 6A and 6B are illustrations of the register during address conversion according to the second embodiment.
Figure 6B:
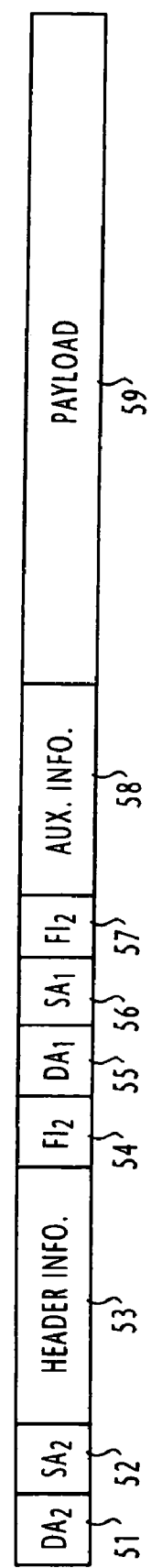

FIG. 5 differs from FIG. 3 in that if the decision at step 305 is affirmative, the routine proceeds to step 501 to transpose $DA_1$ and $SA_1$ with $DA_2$ and $SA_2$ between storage locations 51, 52 and storage locations 55, 56 of the register 31, as shown in FIG. 6A, so that an outgoing packet is formulated in the register as shown in FIG. 6B.

It will be seen that when a packet is received in a first gateway from a source network, the address data $DA_1$ and $SA_1$ of the source network are converted to the address data $DA_2$ and $SA_2$ of an intermediate network and transmitted through the intermediate network to a second gateway. In the second gateway, the address data $DA_2$ and $SA_2$ of the intermediate network are reconverted to the address data $DA_1$ and $SA_1$ of a destination network and transmitted through the destination network where the packet is routed to a destination terminal.

What is claimed is:

1. A method of transmitting a packet between a first network and a second network, comprising:
   receiving the packet from the first network, the packet including source and destination addresses associated with the first network and source and destination addresses associated with the second network;
   storing the packet in a memory, the source and destination addresses associated with the first network occupying first locations in the memory, the source and destination addresses associated with the second network occupying second locations in the memory;
   discarding the source and destination addresses associated with the first network from the memory;
   moving the source and destination addresses associated with the second network from the second locations to the first locations in the memory to create a modified packet; and
   transmitting the modified packet to the second network.

2. The method of claim 1, further comprising:
   moving other data of the packet to occupy the second locations previously occupied by the source and destination addresses associated with the second network, where a length of the packet after the moving of the other data is smaller than a length of the packet before the moving of the other data.

3. The method of claim 1, where a length of the modified packet is smaller than a length of the packet.

4. The method of claim 1, further comprising:
   determining whether the packet includes an auxiliary header that includes the source and destination addresses associated with the second network, where the discarding and the moving are performed in response to determining that the packet includes the auxiliary header.

5. A network device connected between a first network and a second network, comprising:
   a first interface connected to the first network to receive a packet from the first network, the packet including a first set of source and destination addresses associated with the first network and a second set of source and destination addresses associated with the second network;

an address converter to create a modified packet, the address converter including:

a memory to store the first set of source and destination addresses in a first set of storage locations and the second set of source and destination addresses in a second set of storage locations, where the address converter is configured to discard the first set of source and destination addresses from the first set of storage locations and move the second set of source and destination addresses from the second set of storage locations to the first set of storage locations in the memory; and a second interface connected to the second network to transmit the modified packet to the second network.

6. The network device of claim 5, where a length of the packet after discarding the first set of source and destination addresses is smaller than a length of the packet before discarding the first set of source and destination addresses.

7. A network device connected between a first network and a second network comprising:

a first interface connected to the first network to receive a packet from the first network, the packet including a first address stored in a first location and a second address stored in a second location;

an address converter to:

discard the first address from the first location, move the second address from the second location to the first location, and move other data in the packet to the second location, where a length of the packet after moving the other data is smaller than a length of the packet before moving the other data; and a second interface connected to the second network to receive the packet from the address converter and transmit the packet to the second network.

8. The network device of claim 7, where the address converter is further configured to determine whether the packet includes an auxiliary header that includes the second address, where the address converter discards the first address and moves the second address in response to determining that the packet includes the auxiliary header.

9. The network device of claim 7, where the first address includes a first source address and a first destination address, and the second address includes a second source address and a second destination address.

10. A network device connected between a first network and a second network, comprising:

a first interface connected to the first network to receive a packet from the first network, the packet including a first set of source and destination addresses associated with the first network, a second set of source and destination addresses associated with the second network, and header data, the first set of source and destination addresses occupying a first set of locations in the packet, the second set of source and destination addresses occupying a second set of locations in the packet, and the header data occupying a third location in the packet, where the third location occupies a position between the first set of locations and the second set of locations in the packet;

an address converter to create a modified packet by:

discarding the first set of source and destination addresses, and moving the second set of source and destination addresses from the second set of locations to the first set of locations; and a second interface connected to the second network to transmit the modified packet to the second network.

11. The network device of claim 10, where the first set of addresses includes a first source address and a first destination address, and the second set of addresses includes a second source address and a second destination address.

12. The network device of claim 10, where a length of the modified packet is smaller than a length of the packet.

* * * * *